(12) United States Patent
Kuropka et al.

(10) Patent No.: US 7,071,260 B1
(45) Date of Patent: Jul. 4, 2006

(54) RAPID CURING AQUEOUS COATING AGENTS

(75) Inventors: Rolf Kuropka, Seizen (DE); Thomas Fichtner, Dalheim (DE)

(73) Assignee: Clariant GmbH (DE)

( * ) Notice: Subject to any disclaimer, the term of this patent is extended or adjusted under 35 U.S.C. 154(b) by 0 days.

(21) Appl. No.: 10/130,882

(22) PCT Filed: Nov. 17, 2000

(86) PCT No.: PCT/EP00/11429

§ 371 (c)(1),
(2), (4) Date: Oct. 7, 2002

(87) PCT Pub. No.: WO01/38447

PCT Pub. Date: May 31, 2001

(30) Foreign Application Priority Data

Nov. 23, 1999 (DE) ................. 199 56 128

(51) Int. Cl.
*C08L 33/02* (2006.01)
*C08L 33/04* (2006.01)
*C08L 33/24* (2006.01)
*C08L 39/00* (2006.01)

(52) U.S. Cl. .............. 524/543; 524/815; 524/556; 524/555; 525/217

(58) Field of Classification Search ......... 524/556, 524/815, 8, 220, 543, 555; 525/329.5, 217, 525/328.2, 128.2
See application file for complete search history.

(56) References Cited

U.S. PATENT DOCUMENTS

| 4,571,415 A | 2/1986 | Jordan, Jr. |
|---|---|---|
| 5,403,393 A | 4/1995 | Dubble |
| 5,516,853 A * | 5/1996 | Schneider et al. .......... 525/384 |
| 5,527,853 A | 6/1996 | Landy et al. |
| 5,537,934 A * | 7/1996 | Jensen et al. ............... 106/487 |
| 5,544,972 A | 8/1996 | Boldt |
| 5,840,804 A | 11/1998 | Carl et al. |
| 5,939,514 A * | 8/1999 | Brown et al. ............... 528/229 |
| 6,140,406 A * | 10/2000 | Schliesman et al. ........ 524/493 |
| 6,153,288 A * | 11/2000 | Shih et al. ............... 428/32.26 |
| 6,174,056 B1 * | 1/2001 | Sakaki et al. ............... 347/100 |

FOREIGN PATENT DOCUMENTS

| DE | 44 06 624 | 9/1995 |
|---|---|---|
| EP | 0 200 249 | 12/1986 |
| EP | 0 409 459 | 1/1991 |
| EP | 0 594 321 | 4/1994 |
| EP | 0 721 003 | 7/1996 |
| EP | 0 728 822 | 8/1996 |
| EP | 0 804 514 | 2/1999 |
| WO | 94/29391 | 12/1994 |

OTHER PUBLICATIONS

English abstract for EP 0721003, Jul. 10, 1996.
U.S. Appl. No. 09/868,609, filed Jun. 18, 2001, Kuropka et al.

* cited by examiner

*Primary Examiner*—David W. Wu
*Assistant Examiner*—Satya Sastri
(74) *Attorney, Agent, or Firm*—Charles A. Muserlian

(57) ABSTRACT

The invention relates to rapid-curing aqueous coating agents, containing at least one binding agent and at least one water-soluble, quaternary poly(allylamine). Said agents have rapid curing properties and do not discolor during the curing process. Poly(diallyl dialkyl ammonium chlorides) are particularly suitable for use as the water-soluble quaternary poly(allylamine). The inventive coating agents are suitable for use as dyes, rendering agents, primers and wood paints for external applications.

13 Claims, No Drawings

RAPID CURING AQUEOUS COATING AGENTS

The present invention relates to rapid-drying aqueous coating compositions, to processes for preparing them, and to their use.

Conventional systems for rapid-drying coatings are generally solventborne. With coating compositions based on solvent the rate of drying can be controlled by varying the solids content and/or the solvent. Aqueous coating compositions are more environment-friendly and in recent times have come more and more to replace their solvent-based counterparts. Aqueous coating compostiions generally comprise polymer dispersions as binders.

A disadvantage of aqueous coating compositions is the dependence of the drying rate on the temperature and the atmospheric humidity. At low atmospheric humidity the drying rate is often rapid, in some cases even more rapid than with conventional coating compositions. At high atmospheric humidities and low temperatures, however, such as in the morning and in the evening, for example, and also before and after rainfall, the drying rate is greatly retarded, since the evaporation of the water is delayed. Coatings of this type then become rain-resistant only after very long drying times. Accelerated drying of aqueous coating compositions is desirable particularly for exterior applications, such as, for example, paints for buildings, bridges, ships, and road markings, and also for exterior renders.

For quick-drying aqueous coating compositions there are three different principles possessing practical relevance.

In one variant of the principle known as the flocculation principle, the coating composition comprises an ionically stabilized binder, a polyamine, and ammonia as volatile base, which evaporates following the application of the coating composition, the binder flocculating as a result (U.S. Pat. No. 5,527,853, EP-A-0 594 321, EP-A-0728 822, EP-A-0 409 459). In another variant, the coating composition likewise comprises an ionic stabilized binder and its flocculation is accomplished by spraying an acid solution or a salt solution simultaneously with the coating composition (WO 94/29 391, EP-A-0 200 249, U.S. Pat. No. 4,571,415, U.S. Pat. No. 5,403,393).

A change in viscosity at the surface of the coating compositions can be brought about by applying either a thickener to the fresh coating, thereby producing an increase in viscosity, as disclosed, for example, in EP-A-0 721 003 or a base to the fresh coating which comprises a thickener which, however, is not activated by formulation of a low pH. EP-B-0 804 514 describes rapid-curing aqueous coating compositions comprising an aqueous, anionically stabilized emulsion and a polyimine.

In the case of coating compositions where drying is activated by evaporation of a volatile base such as ammonia, the scope of application is limited as a result of the odor nuisance which occurs. Coating compositions which are brought into contact with salts following their application have the disadvantage of being restricted to the use of weakly stabilized dispersions. The salts used must be sprayed at the same time or sprayed or scattered on subsequently. In the case of subsequent application of the salts in solid or dissolved form, considerable fractions may be washed away as a result, for example, of rain, thereby severely impairing the efficiency of the method. The quantities of salt washed away by rain generally pass into the ground water, which is undesirable.

The addition of a polyimine to a coating composition based on an aqueous, anionically stabilized emulsion has the disadvantage that the mixture, as soon as it is dry, tends to yellow. This is the case particularly with emulsions based on vinyl acetate copolymers. For decorative exterior applications, this yellowing of the coating is accompanied by unwanted shifts in shade. Another disadvantage of the addition of polyimines lies in the greatly fluctuating pot lives of the coating compositions. Depending on the stability of the emulsion used, the pot lives are between a few minutes and several days. A further disadvantage is that the polyimines can only be used with coating compositions on aqueous, anionically stabilized emulsions. It would, however, be highly desirable to be able to use them in the case of coating compositions based on aqueous emulsions stabilized by means of protective colloids (e.g., cellulose ethers or polyvinylypyrrolidone) or with mixtures of protective colloids and anionically stabilized emulsifiers.

It has surprisingly now been found that aqueous coating compositions which comprise a) at least one, preferably one, aqueous binder and are characterized in that they comprise b) at least one water-soluble quaternary poly(allylamine)

exhibit markedly accelerated drying without any marked discoloration occurring on drying.

As regards the binder present in the coating composition, it is of course also possible for said binder to comprise a mixture of different binders.

The weight fraction of binder (solids) in the coating composition, based on the weight of dry material in the coating composition, is preferably between 4 and 99.5% by weight and with particular preference between 7 and 55% by weight.

The total content of water-soluble quaternary poly(allylamines) (solids) based on the binder (solids) is preferably up to 10% by weight, with particular preference from 0.05 to 5% by weight, and in particular from 0.5 to 3% by weight.

Suitable water-soluble quaternary poly(allylamines) include preferably the poly(allylamine-ammonium chlorides), with particular preference the poly(diallyldialkylammonium chlorides) and in particular the poly(diallyldimethylammonium chlorides).

The number average of the molecular weight of the water-soluble quaternary poly(allylamines) is preferably in the range from 10 000 g/mol to 500 000 g/mol.

In order to increase the pot life of the coating compositions they may further comprise an emulsifier or a mixture of emulsifiers. Suitable emulsifiers include preferably alkyl and/or aryl ethoxylates, with particular preference nonionic alkyl and/or aryl ethoxylates, and in particular polyaryl and/or polyalkyl polyethylene glycol ethers. The total amount of emulsifiers in the coating composition, based on the binder, is preferably up to 10% by weight, with particular preference up to 5% by weight, and in particular from 0.5 to 3% by weight.

The binders preferably comprise aqueous polymer dispersions based on homopolymers and/or copolymers. Particularly preferred homopolymers and copolymers contain at least one olefinically unsaturated monomer building block. Particular preference is given to copolymers containing from 70 to 99.7% by weight, based on the total amount of the monomers, of free-radically polymerizable olefinically unsaturated compounds from the group consisting of acrylates and methacrylates of ($C_1$ to $C_{12}$) monoalcohols, preferably of ($C_1$ to $C_8$) monoalcohol, examples being methanol, ethanol, isopropanol, isobutanol, n-butanol and 2-ethylhexyl alcohol, vinylaromatic monomers, vinyl esters of ($C_1$ to $C_{12}$) alkanemonocarboxylic acids, examples being vinyl acetate, vinyl propionate, vinyl n-butyrate, vinyl laurate, ®VeoVa 9 and ®VeoVa 10 (Shell-Chemie, vinyl esters of α,α-dialkyl-branched monocarboxylic acids), vinyl halides, examples being vinyl chloride and vinylidene chloride, α,β-monoolefinically unsaturated nitriles, examples being acrylonitrile and methacrylonitrile, and alkyl esters of monoolefinically unsaturated dicarboxylic acids, examples being di-n-butyl maleate and fumarate.

The copolymers further contain preferably from 0.3 to 10% by weight, with particular preference from 0.5 to 5% by weight, based on the total amount of the monomers, of α,β-monoolefinically unsaturated monocarboxylic and dicarboxylic acids, examples being acrylic acid, methacrylic acid, itaconic acid, maleic acid, and fumaric acid, and their amides with or without substitution on the nitrogen atoms, examples being acrylamide, methacrylamide, N-methylolacrylamide, and N-butoxymethacrylamide.

It is also possible for from 0 to 20% by weight, preferably from 0.5 to 5% by weight, based on the total amount of the monomers, of functional monomers to be present in the copolymers, such as, for example, hydroxyl-containing monomers, such as hydroxyalkyl acrylates and methacrylates, especially hydroxyethyl methacrylate and hydroxypropyl methacrylate, and/or acetylacetoxy-containing monomers which improve the wet adhesion, particularly allyl acetoacetate, acetylacetoxyethyl methacrylate, and acetylacetoxybutyl methacrylate, and/or monomers with a crosslinking action such as monomers containing epoxide groups and monomers containing silane groups, especially glycidyl acrylate, glycidyl methacrylate, vinyltrimethoxysilane, and methacryloyloxypropyltrimethoxysilane, and/or nitrogen-containing monomers from the group consisting of polymerizable monomers containing an amino, ureido or N-heterocyclic group, examples being dimethylaminoethyl acrylate and methacrylate, N-(2-methacryloylethyl)ethyleneurea, and/or monomers containing keto groups, examples being diacetoneacrylamide, diacetonemethacrylamide, acrolein, and 2-butanone methacrylate.

In self-crosslinking dispersions, polymers containing keto groups may also contain up to 5% by weight, based on the total amount of the monomers, of a difunctional or polyfunctional carboxylic hydrazide, an example being adipic hydrazide.

With preference, the polymer dispersions used as binders comprise anionically stabilized polymer dispersions or polymer dispersions stabilized with mixtures of nonionic and anionic stabilizers or mixtures of nonionic emulsifiers, anionic emulsifiers, and protective colloids.

Examples of suitable nonionic emulsifiers include alkyl polyglycol ethers or ethoxylation products of polypropylene oxide. Suitable anionic emulsifiers include primarily the alkali metal salts or ammonium salts of alkyl-, aryl- or alkylarylsulfonates, alkyl, aryl or alkylaryl sulfates, alkyl, aryl or alkylaryl phosphates or alkyl-, aryl- or alkylarylphosphonates.

Suitable protective colloids include natural substances, such as gum arabic, starch, and alginates, for example, or modified natural substances, such as cellulose derivatives, for example, or synthetic polymers, such as polyvinyl alcohol and polyvinylpyrrolidone, for example, or mixtures thereof.

Besides emulsifiers and protective colloids, the polymer dispersions may, where appropriate, further comprise additives, auxiliaries and/or noncopolymerizable crosslinkers.

Where appropriate, the coating compositions further comprise film formers, pigments, fillers (such as titanium dioxide, talc, calcite, dolomite, for example), thickeners (such as cellulose ethers, acrylic acid, polyurethane thickeners, for example), protective colloids, dispersants, wetting agents, preservatives and/or defoamers. The pigment volume concentration (PVC) is generally between 15 and 90%.

The coating compositions of the invention preferably comprise renders, paint, primers or wood coatings for exterior applications. With particular preference the coating compositions of the invention comprise synthetic resin renders, masonry paints, road marking paints or wood preservative paints.

In a wider sense, the coating compositions of the invention may also comprise adhesives, pastes, putties, sealants or pressure compensation coatings for exterior insulation and finish systems.

A process for preparing the coating compositions of the invention comprises preparing a mixture comprising a) at least one, preferably one, aqueous binder, b) at least one water-soluble quaternary poly(allylamine), and c) if desired, an emulsifier or mixture of emulsifiers, after which the mixture may where appropriate be further admixed with film formers, pigments, fillers, (such as titanium dioxide, talc, calcite, dolomite, for example), thickeners (such as cellulose ethers, acrylic acid, polyurethane thickeners, for example), protective colloids, dispersants, wetting agents, preservatives, emulsifiers and/or defoamers.

A further process for preparing the coating compositions of the invention comprises adding to a coating composition at least one water-soluble quaternary poly(allylamine) and, if desired, an emulsifier or mixture of emulsifiers. Suitable emulsifiers for this purpose include preferably polyaryl and/or polyalkyl ethylene glycol ethers.

The invention also relates to the use of the coating compositions of the invention as binders.

The invention likewise relates to the use of water-soluble quaternary poly(allylamines) or mixtures of water-soluble quaternary poly(allylamines) as drying accelerators in coating compositions and binders.

The invention is described in more detail below with reference to examples, but without being restricted thereby.

A) Preparation of Inventive Synthetic Resin Renders and Comparative Renders.

The inventive synthetic resin renders and comparative renders described in the examples and comparative examples, respectively, have the base formulation indicated in Table 1.

TABLE 1

Base formulation of the inventive synthetic resin renders and comparative renders

| Constituents | Parts by weight |
|---|---|
| 1. Water | 56.9 |
| 2. Cellulose ether (MC type, medium viscosity) | 1.5 |
| 3. Dispersant (polyacrylate) | 3.0 |
| 4. Preservative (isothiazolinone) | 2.0 |
| 5. Wetting agent (polyphosphate) | 0.6 |
| 6. Sodium hydroxide solution, 10% | 2.0 |
| 7. Defoamer (based on mineral oil) | 2.0 |
| 8. Synthetic resin dispersion (Mowilith ® DM 2452, Clariant GmbH) | 140.0 |

TABLE 1-continued

Base formulation of the inventive synthetic resin renders and comparative renders

| Constituents | Parts by weight |
|---|---|
| 9. Pigment (titanium dioxide) | 20.0 |
| 10. Filler (kaolin 3 μm) | 20.0 |
| 11. Filler (calcite, particle size 40 μm) | 150.0 |
| 12. Filler (calcite, particle size 130 μm) | 170.0 |
| 13. Filler (calcite 130 μm–500 μm) | 100.0 |
| 14. Texturing grain (calcite 1.5–2.0 mm) | 300.0 |
| 15. Auxiliary film former (aliphatic hydrocarbon) | 4.0 |
| 16. Auxiliary film former (glycol ether) | 6.0 |
| 17. Fiber (polyethylene) | 2.0 |
| | 980.0 |

COMPARATIVE EXAMPLE 1

Preparation of a Comparative Render 1 Containing No Water-Soluble Quaternary Poly(allylamine)

The composition of the comparative render 1 corresponds to the base formulation indicated in Table 1. The synthetic resin dispersion used as binder, Mowilith® DM 2452 from Clariant GmbH (Table 1, constituent No. 8), has a solids content of 50%, a pH of 6, and a viscosity of 400 mPa·s. The monomer basis of this dispersion is formed by vinyl acetate, vinyl esters of Versatic® acid, and acrylates.

To prepare the render, the water is introduced initially and the remaining constituents are added in the stated order with mixing. After the end of addition of the raw materials, the render is mixed until completely homogeneous.

EXAMPLE 1

Preparation of the Inventive Synthetic Resin Render 1, Containing a Water-Soluble Quaternary Poly(allylamine)

The composition of the synthetic resin render 1 differs from the base formulation indicated in Table 1 only in that it additionally contains 1.7 parts by weight (40%) of a poly(diallyldimethylammonium chloride) (Cartafix VXT from Clariant GmbH), and also 0.04 part by weight (40%) of a poly(arylalkyl) phenol polyethylene glycol ether (Emulsogen 3474 from Clariant GmbH). To prepare the render the water is introduced initially and the remaining constituents are added in the stated order with mixing. The quaternary poly(allylamine) and the glycol ether are added last. After the raw materials have been added the render is mixed until completely homogeneous.

COMPARATIVE EXAMPLE 2

Preparation of a Comparative Render 1, Containing a Polyimine

The composition of the comparative render 2 differs from the base formulation indicated in Table 1 only in that it additionally contains 0.3 part by weight of a polyimine (Basophob RS from BASF). The same synthetic resin dispersion as in comparative example 1 is used as binder. To prepare the render the water is introduced initially and the remaining constituents are added in the stated order with mixing. The polyimine is added last. After the raw materials have been added the render is mixed until completely homogeneous.

EXAMPLES 2 TO 5

Preparation of the Inventive Synthetic Resin Renders 2 to 5, Containing Different Amounts of a Water-Soluble Quaternary Poly(allylamine)

The compositions of the inventive synthetic resin renders 2 to 5 differ from the base formulation indicated in Table 1 only in that they further comprise the parts by weight indicated in Table 2 of a poly(diallyldimethylammonium chloride) (Cartafix VXT from Clariant GmbH) and of a poly(arylalkyl)phenol polyethylene glycol ether (Emulsogen 3474 from Clariant GmbH).

TABLE 2

| Synthetic resin (SR) render | Parts by weight of Cartafix VXT | Parts by weight of Emulsogen 3474 |
|---|---|---|
| SR render 2 | 1.0 | 0.7 |
| SR render 3 | 1.2 | 0.6 |
| SR render 4 | 1.5 | 0.5 |
| SR render 5 | 1.9 | 0.4 |

To prepare the renders the water is introduced initially and the remaining constituents are added in the stated order with mixing, the Cartafix VXT and the Emulsogen 3474 being added last. When the raw materials have been added, the render is mixed until completely homogeneous.

B) Performance tests of the Comparative Renders 1 and 2 and of the Inventive Synthetic Resin Renders 1 to 5 a) Production of Test Specimens

The substrate, the comparative renders 1 and 2, the inventive synthetic resin renders 1 to 5, and the mold required are conditioned in a climate chamber to the test temperature of 5° C. At this temperature, the renders are applied to a fiber cement panel with the dimensions 10 cm×15 cm using a trowel, and are then drawn off to the thickness of the grain, and textured.

b) Testing of the Test Specimens

After different drying times at a test temperature of 5° C. the test specimens are examined for their degree of drying. To this end the test specimens are each sprayed with 60 grams of water. The water mist is generated using a commercially customary atomizer. During the spraying operation, the test specimens are situated upright. The liquid running off is collected quantitatively. While the coating composition had not yet dried, the test liquid washes out particles, and as a result acquires a whitish discoloration. The intensity of the coloring allows conclusions to be drawn about the drying state of the coating composition.

The degree of drying of the renders is assessed in accordance with the six classes 1 to 6 listed in Table 3, after different times.

In addition to the degrees of drying of the renders, the degrees of yellowing of the dried renders are also determined after storage periods varying in their length. The assessment is made in accordance with the six classes 1 to 6 which are likewise set out in Table 3.

TABLE 3

Degrees of drying and degrees of yellowing

| Class | Degree of drying | Degree of yellowing |
|---|---|---|
| 1 | dry | no yellowing |
| 2 | almost dry | very slight yellowing |
| 3 | fairly dry | slight yellowing |
| 4 | moist | yellowing |
| 5 | wet | severe yellowing |
| 6 | very wet | very severe yellowing |

The degrees of drying and degrees of yellowing of the comparative renders 1 and 2 and of the inventive synthetic resin renders 1 to 5 are set out in Table 4 in accordance with the six different classes indicated in Table 3.

TABLE 4

Degrees of drying and degrees of yellowing of the comparative renders 1 and 2 and of the inventive synthetic resin renders 1 to 5

| Renders | Degree of drying after | | | Yellowing of the dried render coat after | |
|---|---|---|---|---|---|
| | 0.5 h | 1 h | 2 h | 1 day of storage at 50° C. | 10 days of storage at 50° C. |
| Comp. render 1 | 6 | 5 | 4 | 1 | 1 |
| Comp. render 2 | 3 | 2 | 1 | 4 | 6 |
| SR render 1 | 3–4 | 2 | 1 | | |
| SR render 2 | 5 | 3 | 2 | 1 | 1 |
| SR render 3 | 5 | 3 | 1–2 | 1 | 1 |
| SR render 4 | 4 | 2 | 1–2 | 1 | 1 |
| SR render 5 | 3 | 2 | 1 | 1 | 1 |

Table 4 shows clearly that the inventive synthetic resin renders 1 to 5 have much better degrees of drying than the comparative render 1 and at the same time exhibit no yellowing tendency in comparison to the comparative render 2.

The invention claimed is:

1. A rapid drying aqueous render, paint, primer or wood coating material comprising
   A) a binder comprising an aqueous polymer or a copolymer containing, based on the total amount of the monomers,
      a) from 70 to 99.7% by weight of at least one free-radically polymerizable olefinically unsaturated compound selected from the group consisting of acrylates and methacrylates of ($C_1$–$C_{12}$) monoalcohols, vinylaromatic monomers, vinyl esters of ($C_1$ to $C_{12}$) alkanemonocarboxylic acids, vinyl halides, α,β-monoolefinically unsaturated nitrites and alkyl esters of monoolefinically unsaturated dicarboxylic acids,
      b) from 0.5 to 10% by weight of at least one compound selected from the group of α,β-monoolefinically unsaturated monocarboxylic and dicarboxylic acids and/or their amides or N-substituted amides, and
      c) up to 20% by weight of compounds selected from the group of hydroxyl-containing monomers, acetylacetoxy-containing monomers, monomers containing epoxide groups, monomers containing silane groups, nitrogen-containing monomers selected from the group consisting of polymerizable monomers containing an amino, ureido or N-heterocyclic group and/or monomers containing keto groups,
   B) at least one water-soluble quaternary poly(allylamine) and C) up to 10% by weight, based on the binder, of at least one nonionic emulsifier.
2. The composition of claim 1, wherein the total amount of the at least one water-soluble quaternary poly(allylamine), based on the binder present in the coating composition, is up to 10% by weight.
3. The composition of claim 1, wherein the at least one quaternary poly(allylamine) is poly(diallyldialkylammonium chloride).
4. The composition of claim 3, wherein the at least one quaternary poly(allylamine) is poly(diallyldimethylammonium chloride).
5. The composition of claim 1, wherein the emulsifiers are nonionic alkyl and/or aryl ethoxylates or ethoxylates or ethoxylation products of polypropoyleneoxide.
6. The composition of claim 1 further comprising at least one additive selected from the group consisting of film formers, pigments, fillers, thickeners, dispersants, wetting agents, preservatives, emulsifiers, protective colloids and defoamers.
7. The composition of claim 1, wherein the coating composition is a synthetic resin render, a masonry paint, a road marking paint or a wood preservative paint.
8. The composition of claim 1, wherein the coating composition is an adhesive, a paste, a putty, a sealant or a pressure compensation coating for exterior insulation and finish systems.
9. A process for preparing a rapid drying render, paint, primer or wood coating material for exterior application composition comprising the step of preparing a mixture comprising an aqueous copolymer containing, based on the total amount of the monomers,
   a) form 70 to 99.7% by weight of at least one free-radically polymerizable olefinically unsaturated compound selected from the group consisting of acrylates and methacrylates of $C_1$–$C_{12}$ alcohols, vinylaromatic monomers, vinyl esters of $C_1$–$C_{12}$ alkanemonocarboxylic acids vinyl halides α, β-monoolefinically unsaturated nitriles and/or alkyl esters of monoolefinically unsaturated dicarboxylic acids,
   b) from 0.5 to 10% by weight of at least one compound selected from the group of α, β-monoolefinically unsaturated monocarboxylic and dicarboxylic acids and/or their amides or N-substituted amides, and
   c) up to 20% by weight of compounds selected from the group of hydroxyl-containing monomers, acetylacetoxy-containing monomers, monomers containing epoxide groups, monomers containing silane groups, nitrogen-containing monomers selected from the group consisting of polymerizable monomers containing an amino, ureido or N-heterocyclic group and/or monomers containing keto groups,
B) at least one water-soluble quaternary poly(allylamine), and
C) up to 10% by weight based on the binder of at least one nonionic emulsifier.
10. A drying accelerator for use in aqueous coating compositions or binders comprising a composition of claim 1.
11. The process of claim 9, wherein the mixture further comprises at least one additive selected from the group consisting of film formers, pigments, fillers, thickeners, protective colloids, dispersants, wetting agents, preservatives, emulsifiers and/or defoamers.
12. The composition of claim 1 wherein the quaternary poly(allylamine) has a molecular weight of 10,000 to 500,000 g/mol.
13. The composition of claim 12 containing at least 0.05% by weight of the quaternary poly(allylamine), based on the binder present.

* * * * *